(12) United States Patent
Suk et al.

(10) Patent No.: US 11,377,837 B2
(45) Date of Patent: Jul. 5, 2022

(54) IMMISCIBLE LIQUIDS SEPARATION APPARATUS AND METHOD

(71) Applicant: ACO Severin Ahlmann GmbH & Co. Kommanditgesellschaft, Büdelsdorf (DE)

(72) Inventors: Marek Suk, Zdar nad Sazavou (CZ); Zbynek Sabiniok, Sezimovo Usti (CZ); Petr Langpaul, Nizkov (CZ)

(73) Assignee: ACO AHLMANN SE & CO. KG, Budelsdorf (DE)

( * ) Notice: Subject to any disclaimer, the term of this patent is extended or adjusted under 35 U.S.C. 154(b) by 0 days.

(21) Appl. No.: 17/279,833

(22) PCT Filed: Sep. 20, 2019

(86) PCT No.: PCT/EP2019/075399
§ 371 (c)(1),
(2) Date: Mar. 25, 2021

(87) PCT Pub. No.: WO2020/064571
PCT Pub. Date: Apr. 2, 2020

(65) Prior Publication Data
US 2021/0395992 A1  Dec. 23, 2021

(30) Foreign Application Priority Data
Sep. 28, 2018 (GB) ..................................... 1815872

(51) Int. Cl.
*E03F 5/16* (2006.01)
*B01D 17/02* (2006.01)
*C02F 1/40* (2006.01)

(52) U.S. Cl.
CPC ............ *E03F 5/16* (2013.01); *B01D 17/0214* (2013.01); *C02F 1/40* (2013.01)

(58) Field of Classification Search
CPC ........... E03F 5/16; B01D 17/0214; C02F 1/40
(Continued)

(56) References Cited

U.S. PATENT DOCUMENTS 1,164,527 A  *  12/1915  Kelly ........................ C02F 1/40
                                                            210/540
3,199,676 A       8/1965  May
(Continued)

FOREIGN PATENT DOCUMENTS

CN      201704786 U      1/2011
CN      102985369 A      3/2013
(Continued)

OTHER PUBLICATIONS

The Search and Examination Report issued in GB Application No. 1815872.5; dated Apr. 29, 2019.
(Continued)

*Primary Examiner* — Christopher Upton
(74) *Attorney, Agent, or Firm* — Pearne & Gordon LLP

(57) ABSTRACT

An immiscible liquids separation apparatus (50) comprising: a vessel comprising a first separation chamber (66) and second separation chamber (72) being in first fluid communication with the first separation chamber (66), the first separation chamber (66) being situated above the second separation chamber (72); an inlet (52) arranged at the first separation chamber (66) to allow a liquid to flow into the vessel; a low-density liquid outlet (78) arranged on the second separation chamber (72) to allow low-density liquid separated from the liquid to be removed therefrom; and a high-density liquid outlet (60) arranged at the vessel to allow high-density liquid separated from the liquid to flow out of the vessel, and a corresponding method.

17 Claims, 4 Drawing Sheets

(58) Field of Classification Search
USPC .................................. 210/801, 521, 538, 540
See application file for complete search history.

(56) References Cited

U.S. PATENT DOCUMENTS

| | | | |
|---|---|---|---|
| 4,151,087 A | 4/1979 | Sakaguchi et al. | |
| 4,422,931 A * | 12/1983 | Wolde-Michael | B01D 17/0214 210/540 |
| 5,560,826 A * | 10/1996 | Szereday | B01D 17/0214 210/540 |
| 6,517,715 B1 * | 2/2003 | Batten | B01D 17/0214 210/540 |
| 7,361,282 B2 * | 4/2008 | Smullin | B01D 17/0214 210/703 |
| 8,153,004 B2 * | 4/2012 | Rodriguez-Jovet | B01D 17/0214 210/538 |
| 10,035,716 B1 | 7/2018 | Sowerby et al. | |
| 2002/0108902 A1 * | 8/2002 | Naski | E03F 5/16 210/521 |
| 2004/0222156 A1 | 11/2004 | Yu et al. | |
| 2005/0211620 A1 | 9/2005 | Owen et al. | |
| 2008/0149553 A1 | 6/2008 | Sowerby et al. | |
| 2011/0297626 A1 * | 12/2011 | Batten | B01D 17/0214 210/521 |

FOREIGN PATENT DOCUMENTS

| | | |
|---|---|---|
| CN | 207726772 U | 8/2018 |
| GB | 1535160 A | 12/1978 |
| GB | 2511292 A | 9/2014 |
| KR | 20160032744 A | 3/2016 |
| WO | 2011079316 A1 | 6/2011 |

OTHER PUBLICATIONS

An Office Action issued in the corresponding Chinese Application No. 201980063168.8; dated Dec. 24, 2021.

* cited by examiner

IMMISCIBLE LIQUIDS SEPARATION APPARATUS AND METHOD

The present technique relates to the field of immiscible liquids separation. More particularly, it relates to immiscible liquids separation apparatus and methods, such as grease removal devices (GRD) and processes, and passive grease removal devices (PGRD) and processes.

Waste liquids, such as waste water, may comprise water as well as fat, oil and/or grease (FOG). Waste liquids separators are used in numerous industrial applications. FOG separators are widely used in Food Service Establishments (FSE), such as commercial and institutional kitchens, to separate FOG from waste water and/or to protect waste water (sewage) systems. They ensure free flow of waste water from kitchen equipment, such as sinks, and prevent grease accumulation and, thus, clogging of waste water pipes.

There are different approaches around the world for standardizing ratings and/or establishing performance requirements for grease separators.

A first type of grease separators, known as gravity grease separators, is usually large, installed outside underground and requires an extended time for grease separation (30 minutes or more). The gravity grease separation occurs owing to a difference in specific gravity between FOG and water.

A second type of grease separators, known as hydro mechanical grease separators, is usually compact, installed inside a building and requires less time than the first type. The hydro mechanical grease separation occurs due to several simultaneous actions: a difference in specific gravity between FOG and water, a hydraulic flow action, and/or other additional actions. This type is covered by PDI G101 standard, for example.

Even well-designed and properly installed grease separators are prone to failure if they are not adequately maintained. As an obvious result, a grease separator becomes unable to separate the FOG from the water owing to overloading, and, thus, passes fat, oil, grease and/or sediment downstream.

To avoid such problems, a company specializing in cleaning separators services may be engaged. This is necessary for large separators, may be an expensive approach.

Alternatively, the grease separator may be configured to remove grease automatically. Further, the grease separator may comprise a strainer basket to capture food debris with high separation efficiency.

Whereas PGRDs comprise a passive system for removing FOG from the waste water without moving parts, active GRDs (AGPRs) may comprise an active system, such as a partially submerged mechanical wheel or drum, driven by an electric motor, for removing FOG from the waste water.

A grease separator is usually placed a washing area of a kitchen, below a sink. However, when the grease separator is connected directly below the sink, a waste water flowrate into the grease separator is often fluctuating. A rinsing sink for dishes and cutlery is usually equipped with a shower head usually having a flowrate of 0.05 l/s to 0.15 l/s, whereas a pot-wash sink often has a removable overflow pipe vertically installed at a bottom of the pot-wash sink upward from a drain hole. Waste water flows over an upper edge of the overflow pipe into the installed grease separator. A length of the overflow pipe determines a steady height of a water level in the pot-wash sink. A small amount of water may flow from a water tap into the pot-wash sink in order to dilute the water with clean water. In this way, typically about 20 l to 30 l of water may be retained in the pot-wash sink. After removing of the overflow pipe, the water retained in the pot-wash sink flows into the grease separator at once. When the length of the overflow pipe is 100 mm, a sink discharge flowrate is 0.5 l/s to 1.3 l/s, depending on a type of trap and a size of drainage pipe. When a sink having a depth of 350 mm is completely filled with water and then drained, the sink discharge flowrate can achieve 2 l/s. Such a high sink discharge flowrate significantly reduces efficiency of water/FOG separation inside the separator. Therefore, some manufacturers install a flowrate damper (reducer) in the inlet pipe of the grease separator and, thus, reduce a maximum flowrate to 0.5 l/s, for example.

However, as the flow of the waste water into the separation apparatus may vary, there is a need for an improved separation apparatus and method.

At least some examples provide an immiscible liquids separation apparatus (50) comprising:

a vessel comprising a first separation chamber and second separation chamber being in first fluid communication with the first separation chamber, the first separation chamber being situated above the second separation chamber;

an inlet arranged at the first separation chamber to allow a liquid to flow into the vessel;

a low-density liquid outlet arranged on the second separation chamber to allow low-density liquid separated from the liquid to be removed therefrom; and a high-density liquid outlet arranged at the vessel to allow high-density liquid separated from the liquid to flow out of the vessel.

At least some examples provide an immiscible liquids separation method comprising:

providing a vessel comprising a first separation chamber and second separation chamber being in first fluid communication with the first separation chamber, the first separation chamber being situated above the second separation chamber;

through an inlet arranged at the first separation chamber, allowing a liquid to flow into the vessel;

through a low-density liquid outlet arranged on the second separation chamber, allowing low-density liquid separated from the liquid to be removed therefrom; and through a high-density liquid outlet arranged at the vessel, allowing high-density liquid separated from the liquid to flow out of the vessel.

Further aspects, features and advantages of the present technique will be apparent from the following description of examples, which is to be read in conjunction with the accompanying drawings, in which.

Figure 1:
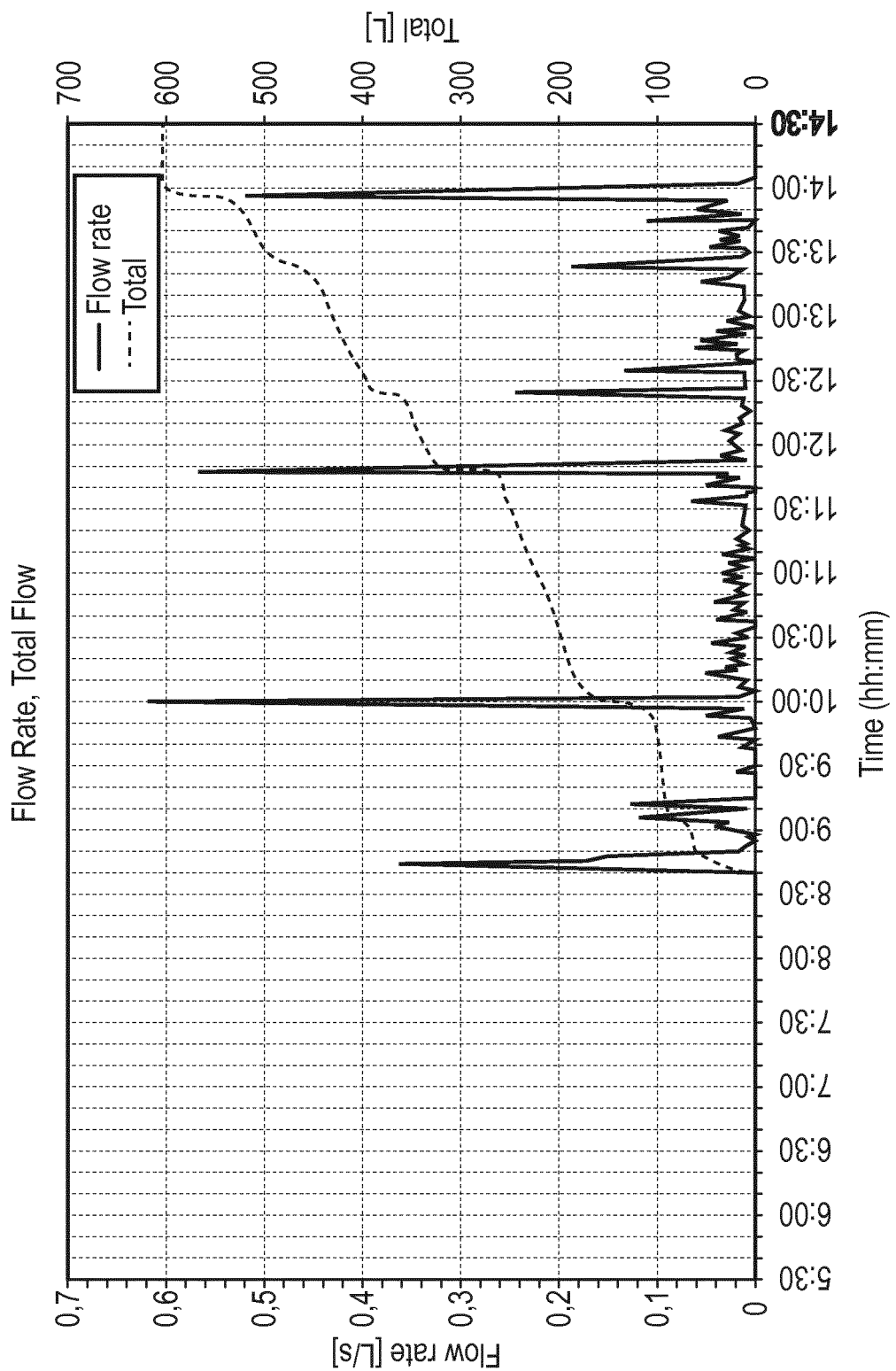
FIG. 1 illustrates example data from a flowmeter installed on an outlet pipe in a commercial kitchen, that simultaneously takes waste water from two sinks.

One of the sinks is used for rinsing plates and cutlery, and the other sink is used for washing pots and pans. The graphs in FIG. 1 show the dependence of monitored values of an immediate waste water flowrate and an accumulated, total waste water flow for the two sinks in dependence on the kitchen's operating time. The waste water flowrate is less than 0.05 l/s for most of the kitchen's operating time, and the discharged waste water accumulates to 600 l in 5.5 h.

Figure 2A:
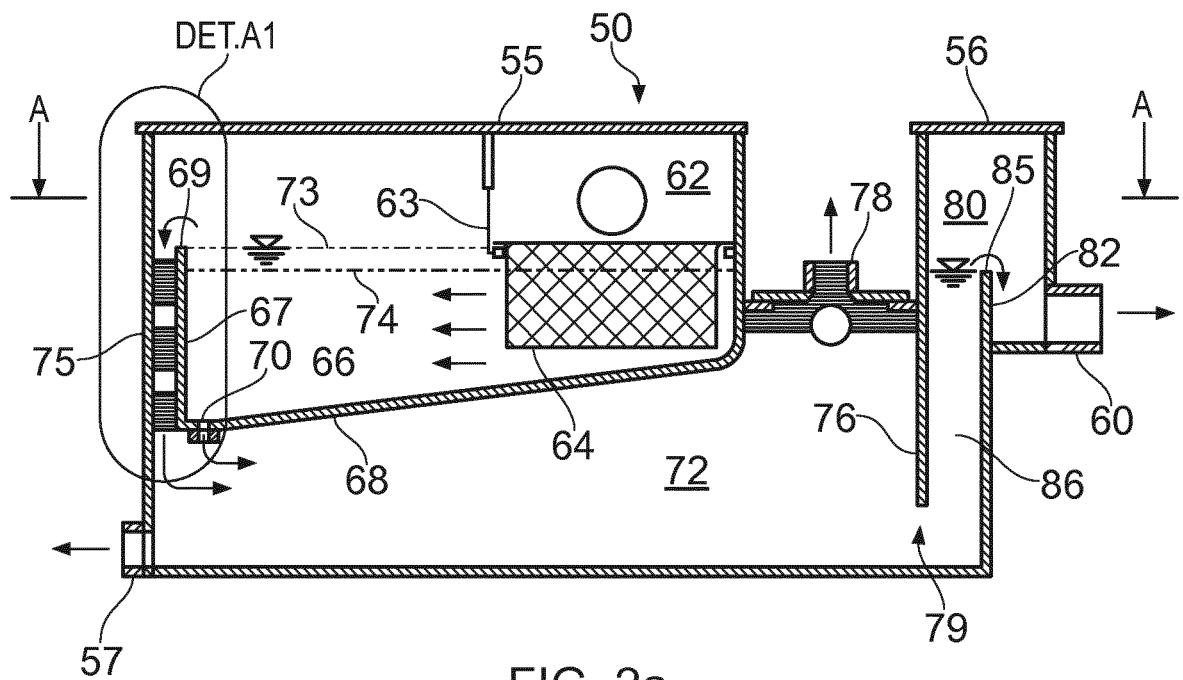
FIG. 2a illustrates a cross-sectional side view of an immiscible liquids separation apparatus 50 according to an embodiment of the invention.
Figure 2B:
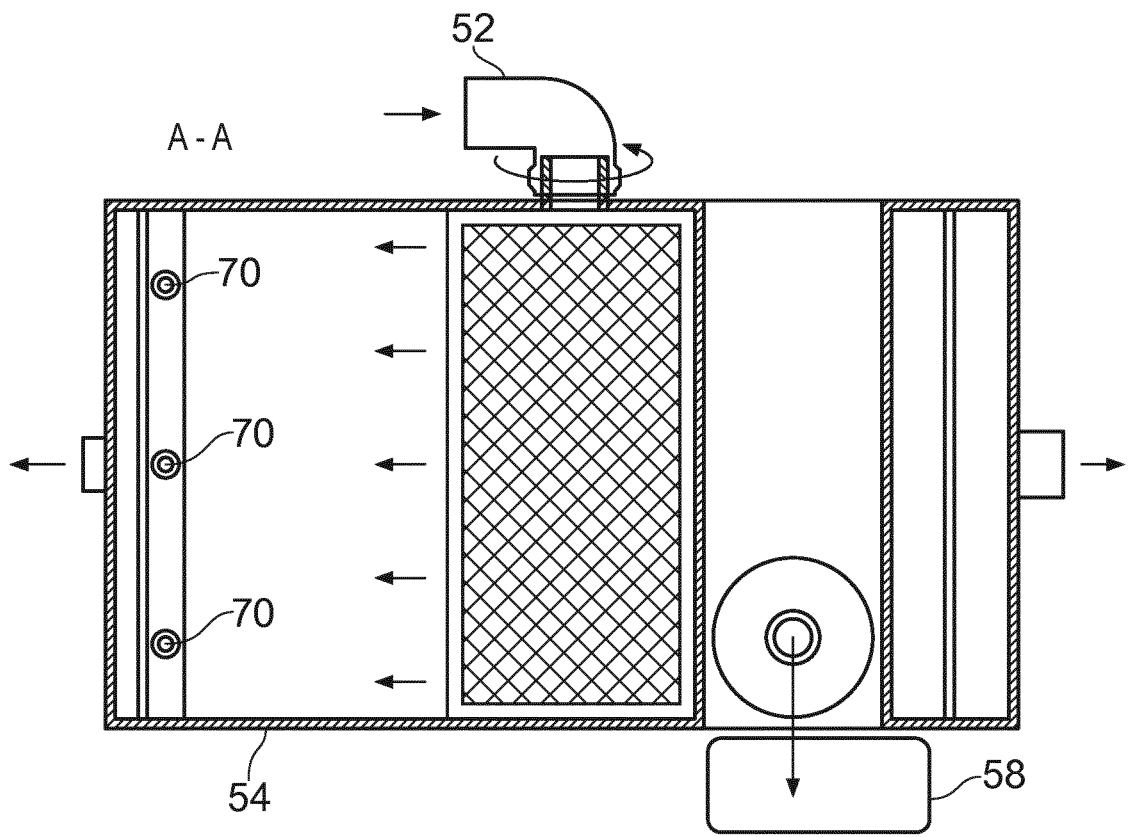
FIG. 2b illustrates a cross-sectional bottom view of the immiscible liquids separation apparatus 50 according to the embodiment of the invention.

FIGS. 2a and 2b illustrate a cross-sectional side view and cross-sectional bottom view of the immiscible liquids separation apparatus 50 according to the embodiment of the invention, respectively.

The immiscible liquids separation apparatus 50 comprises a vessel, an inlet 52, a low-density liquid (FOG) outlet 78, and a high-density liquid (water) outlet 60. The immiscible liquids separation apparatus 50 and/or its components may be made from metal, such as steel or stainless steel, or plastic, for example.

The vessel comprises a first separation chamber 66 and second separation chamber 72. The vessel may be a housing 54. The vessel may comprise one or more lids, such as removable lids 55, 56.

The first separation chamber 66 is situated above the second separation chamber 72. The first separation chamber 66 may comprise a coarse filtration chamber 62. The first separation chamber 66 may comprise a sloped bottom.

The second separation chamber 72 is in first fluid communication with the first separation chamber 66.

The vessel may further comprise a high-density liquid (water) release chamber 80. The high-density liquid (water) release chamber 80 may be in second fluid communication with the second separation chamber 72. The high-density liquid release chamber 80 may comprise a vertical release shaft 86 designed to allow the high-density liquid (water) flowing out of the vessel to take fine silt comprised in the liquid out of the vessel. The vessel may further comprise a container 58 arranged to collect the low-density liquid (FOG) removed from the second separation chamber 72.

The vessel may further comprise a sloped plate 68 arranged to form a/the sloped bottom of the first separation chamber 66 and/or to form a sloped ceiling of the second separation chamber 72. The sloped bottom may comprise at least one hole 70 arranged at a low end of the sloped bottom to allow the first fluid communication at a first flow rate of the liquid (waste water).

The vessel may further comprise a vertical low-density liquid (FOG) gap 75 arranged between the first separation chamber 66 and second separation chamber 72 to allow the first fluid communication at a second flow rate of the liquid, the second flow rate being higher than the first flow rate of the liquid. The vertical low-density liquid (FOG) gap 75 may comprise a coalescent filter, for example removable coalescent filter 88 to increase agglomeration of droplets of the low-density liquid (FOG).

The inlet 52 is arranged at the first separation chamber 66 to allow a liquid (waste water) to flow into the vessel. The inlet 52 may be configured as a rotatable inlet, easing installation.

The low-density liquid (FOG) outlet 78 is arranged on the second separation chamber 72 to allow low-density liquid (FOG) separated from the liquid (waste water) to be removed the second separation chamber 72. The vessel may further comprise a valve arranged at the low-density liquid (FOG) outlet 78 to enable or disable flow of the low-density liquid (FOG) out of the vessel. The valve may be a floating-ball valve 78 comprising a floating member configured to disable the flow of the low-density liquid (FOG) in case the high-density liquid (water) raises the floating member to a predetermined height.

The high-density liquid (water) outlet 60 is arranged at the vessel to allow high-density liquid (water) separated from the liquid (waste water) to flow out of the vessel. The high-density liquid (water) outlet 60 may be arranged at the high-density (water) liquid release chamber 80.

Thus, waste water comprising two or more immiscible liquids of different densities, such as water (high-density liquid) entrained with oil, grease, fats (low-density liquids) and/or other particles, flows into the inlet 52 providing a passage into the housing 54. The inlet 52 may be rotatable in order to ensure a variable connection in case of limited installation space in the kitchen. As described in more detail below, the immiscible liquids separate within the housing 54. Whereas the less-dense liquid (material), e. g. fat, oil and grease, empties into container 58, the more-dense liquid, e. g. water, is discharged from the outlet 60. Silt, typically small particles of suspended solids, may accumulate at the bottom of housing 54. The silt may be periodically discharged through a silt outlet 57, if applicable.

Operation of the separation apparatus 50 will be described in greater detail with reference to FIG. 2a. A coarse filtration chamber 62 is defined between the housing 54 and a perforated plate 63 that may extend across the full width of the housing 54. As waste water enters the coarse filtration chamber 62 through the inlet 52, it passes through a filtering basket 64, which filters out solid particles, such as food debris, undissolved fat and other suspended solids.

After passing through the filtering basket 64, the waste water enters the first separation chamber 66, defined by a control plate 67, a sloped plate 68 and the housing 54. Both control plates 67 and 68 may extend across the full width of the housing 54. There are two exits from the first separation chamber 66: over an upper edge 69 and through holes 70, located at a lowest point of the first separation chamber 66. A sloped plate 68 is angled downward to holes 70. Small particles of suspended solids passing through the filtering basket 64 slide down the sloped plate 68 and fall through holes 70 to the bottom of the housing 54.

At low waste-water flowrates, e. g. less than 0.04 l/s, into the first separation chamber 66, all water flows through holes 70 into the second separation chamber 72. A layer of separated oil appears on a free water level 73. The separated oil remains in chamber 66. The low waste-water flowrate constitutes most of the operating time separation apparatus as shown on FIG. 1, and, thus, promotes oil/water separation in the first separation chamber 66. The separated oil can freely flow through the perforated plate 63.

At zero waste-water flowrate, the level of waste water in the first separation chamber 66 decreases to a level 74, which is at a same height as an outlet overflow edge 85.

At high waste-water flowrate, e. g. more than 0.04 l/s, the waste water is not able to escape from the first separation chamber 66 only through the holes 70. The waste-water level rises up to the upper edge 69, and the waste water starts to overflow into the oil gap 75. The oil gap 75 is defined between the housing 54 and the control plate 67 with a free opening into the second separation chamber 72. The oil gap 75 keeps a specific amount of separated oil which can occupy the complete height of the oil gap 75. This condition supports agglomeration of oil droplets when the separated oil from free water level 73 and other oily water from the first separation chamber 66 flow through the oil gap 75. This coalescent effect may also be increased by inserting a coalescent filter, e. g. removable coalescent filter 88, into the oil gap 75.

The waste water passing through the holes 70 and the oil gap 75 enters the second separation chamber 72 which is defined by the sloped plate 68, a control plate 76 and the bottom of the housing 54. The control plate 76 may extend across the full width of the housing 54. There are two exits from the second separation chamber 72: through a floating-ball valve 78 and through a passage 79, disposed between a bottom edge of the control plate 76 and the bottom of the housing 54. The sloped plate 68 is angled upward from the bottom of the first separation chamber 66 towards the floating-ball valve 78.

A weir plate 82, which may extend across the full width of the housing 54, defines a water release chamber 80, along with the control plate 76 and the housing 54. The outlet 60 is disposed through the housing 54.

As more of the waste water enters the second separation chamber 72, the oil rises. The flow through the second separation chamber 72 is set at a rate that allows the oil to separate from the water and float upwards towards and touching the sloped plate 68, and then further float towards the floating-ball valve 78.

The sloped plate 68 forces the oil to accumulate at the entry to floating-ball valve 78. The floating-ball valve 78 uses a ball that floats at the interface between the high-density liquid (water) and the low-density liquid (oil). When the high-density liquid reaches a predetermined height, the ball rises to height which stops oil flow from the second separation chamber 72 to the container 58.

As the water flows through the separation apparatus 50, it has to rise above an outlet overflow edge 85 (top) of the weir plate 82 in order to exit the separation apparatus 50. Accordingly, the water in the second separation chamber 72 attempts to rise to approximately the same height as the outlet overflow edge 85 is placed. As the top of the second separation chamber 72 is below the outlet overflow edge 85, a hydrostatic pressure of an upwards force of the water pushes the separated oil at the top of the second separation chamber 72 through the floating-ball valve 78. However, the water cannot pass through the floating-ball valve 78, because the floating-ball valve 78 will stop its passage. Hence, once all of the separated oil, or FOG, is forced out of the second separation chamber 72, the floating-ball valve 78 remains closed until more oil accumulates.

The separated water passes through the passage 79, over the weir plate 82 and through the outlet 60. The silt in the water tends to accumulate at the bottom of the housing 54. A silt valve 57, located at the bottom of housing 54, may be opened periodically, and a flow of water out of the silt valve 57 flushes the silt out of the second separation chamber 72.

As described above, the waste-water flowrate from the sink can vary from less than 0.05 l/s to 2 l/s. As shown in FIG. 1, peak flowrates appear during kitchen operation several times per day. In these cases, a dynamic effect of high waste-water flowrate may be used to take silt from the bottom of the housing 54 away through the passage 79 and further through the vertical release shaft 86 between the control plate 76 and the weir plate 82. The higher the flowrate through the vertical release shaft 86 is, the greater the effect. At the flow velocity of 0.1 m/s through the vertical release shaft 86, fine silt is taken off and away, and discharged over the outlet overflow edge 85. In this case, the silt valve 57 may not need to be opened during daily maintenance.

Figure 3:
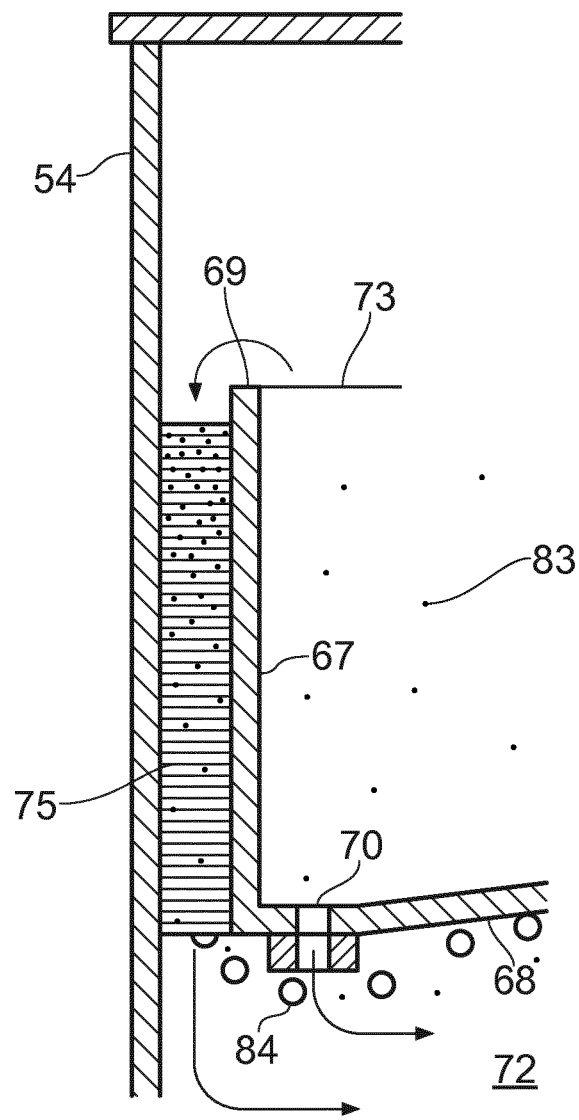
FIG. 3 illustrates a detailed cross-sectional side view of a vertical low-density liquid gap 75 according to the embodiment of the invention.

FIG. 3 illustrates a detailed cross-sectional side view of the vertical low-density liquid gap 75 according to the embodiment of the invention.

In operation, small low-density liquid droplets 83, i. e. small oil droplets, can pass through the holes 70 or flow over the upper edge 69 into the vertical low-density liquid gap 75. Separated low-density liquid from the free high-density liquid level 73, free water level, can only pass over the upper edge 69 into the vertical low-density liquid gap 75. The vertical low-density liquid gap 75 supports agglomeration of the low-density liquid droplets into compact low-density liquid layer that occupies the whole space between the control plate 67 and housing 54. Waste water escaping from the vertical low-density liquid gap 75 tears a lower partition of the vertical low-density liquid gap 75 into big droplets 84 that enter the second separation chamber 72. Just a small amount of low-density liquid droplets 83 flows through the holes 70. As big low-density liquid droplets can easier separate from the liquid, separation efficiency in the second separation chamber 72 is higher.

Figure 4:
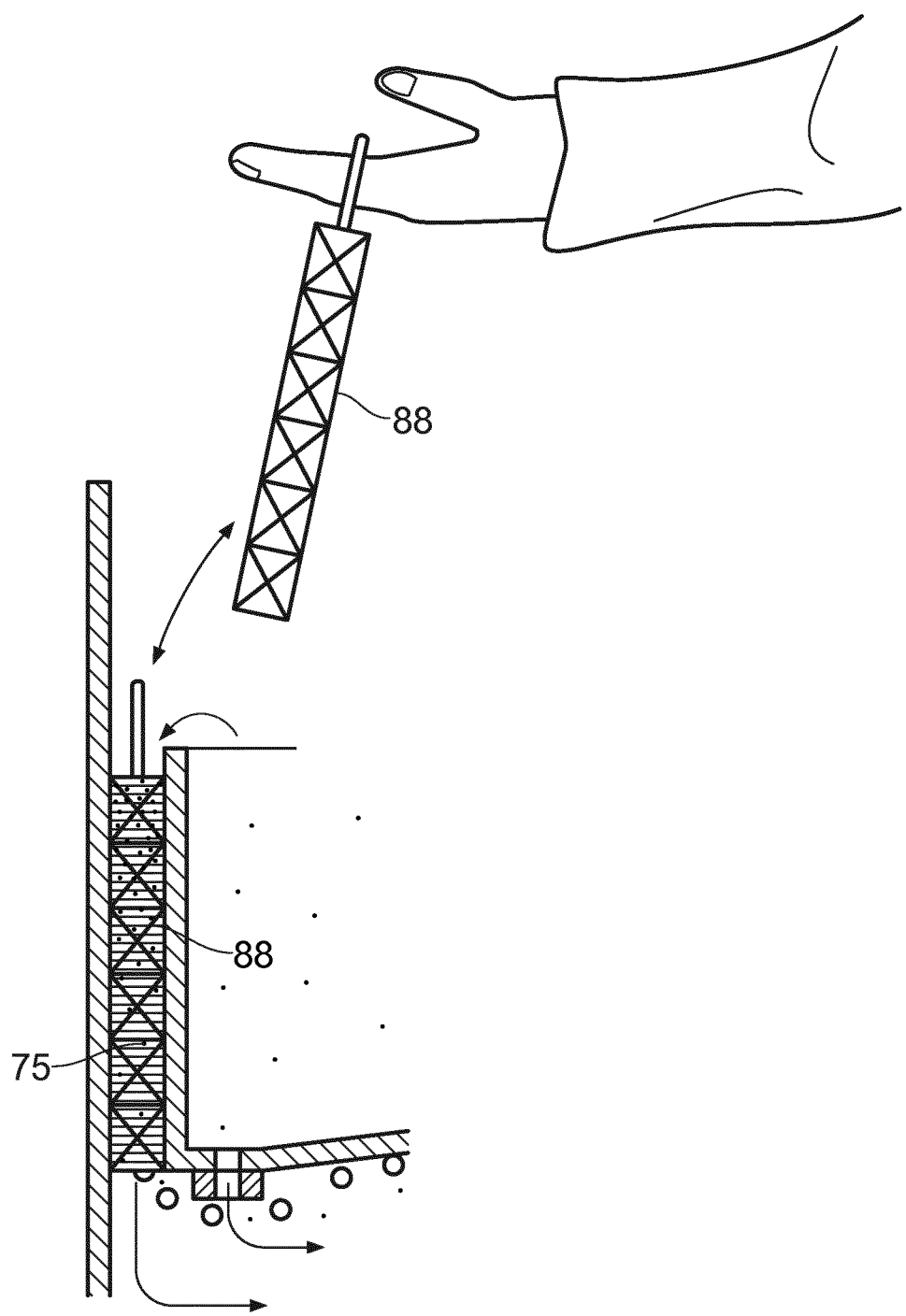
FIG. 4 illustrates a detailed cross-sectional side view of the vertical low-density liquid gap 75 according to another embodiment of the invention.

FIG. 4 illustrates a detailed cross-sectional side view of the vertical low-density liquid gap 75 according to the other embodiment of the invention.

The coalescent filter is prone to clogging. However, the function of the vertical low-density liquid gap 75 may be improved by using a removable coalescent filter 88. The removable coalescent filter 88 may be removed from the vertical low-density liquid gap 75 and cleaned externally.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

LIST OF REFERENCE SIGNS 50 immiscible liquids separation apparatus (passive grease removal device, separator)
52 inlet
54 housing
55, 56 removable lid
57 silt outlet/silt valve
58 container
60 high-density liquid (water) outlet
62 coarse filtration chamber
63 perforated plate
64 filtering basket
66 first separation chamber
67 control plate
68 sloped plate
69 upper edge
70 hole
72 second separation chamber
73 free high-density liquid (water) level 74 level
75 vertical low-density liquid (oil) gap
76 control plate
78 low-density liquid (oil) outlet/floating-ball valve
79 passage
80 high-density liquid (water) release chamber
82 weir plate
83 small low-density liquid (oil) droplet
84 big low-density liquid (oil) droplet
85 outlet overflow edge
86 vertical release shaft
88 removable coalescent filter

The invention claimed is:

1. An immiscible liquids separation apparatus (50) comprising:
- a vessel comprising a first separation chamber (66) and a second separation chamber (72) being in a first fluid communication with the first separation chamber (66), the first separation chamber (66) being situated above the second separation chamber (72);
- an inlet (52) arranged at the first separation chamber (66) to allow a liquid to flow into the vessel;
- a low-density liquid outlet (78) arranged on the second separation chamber (72) to allow low-density liquid separated from the liquid to be removed therefrom;
- a high-density liquid outlet (60) arranged at a high-density liquid release chamber (80) to allow high-density liquid separated from the liquid to flow out of the vessel, wherein the high-density liquid release chamber (80) comprises a vertical release shaft (86), the vertical release shaft (86) comprises a weir plate (82) having an overflow edge (85), the overflow edge (85) being the same height as a zero waste-water flowrate level (74) in the first separation chamber (66); and
- a vertical low-density liquid gap (75) arranged between the first separation chamber (66) and the second separation chamber (72) to allow the first fluid communication, the vertical low-density liquid gap (75) adapted to increase agglomeration of droplets of the low-density liquid.

2. The apparatus according to claim 1, wherein the high-density liquid release chamber (80) is in a second fluid communication with the second separation chamber (72).

3. The apparatus according to claim 2, wherein the vertical release shaft (86) is designed to allow the high-density liquid flowing out of the vessel to take fine silt comprised in the liquid out of the vessel.

4. The apparatus according to claim 1, wherein the vessel further comprises a valve arranged at the low-density liquid outlet (78) to enable or disable flow of the low-density liquid out of the vessel.

5. The apparatus according to claim 4, wherein the valve is a floating-ball valve (78) comprising a floating member configured to disable the flow of the low-density liquid in case the high-density liquid raises the floating member to a predetermined height.

6. The apparatus according to claim 1, further comprising: a container (58) arranged to collect the low-density liquid removed from the second separation chamber (72).

7. The apparatus according to claim 1, wherein the inlet (52) is configured as a rotatable inlet.

8. The apparatus according to claim 1, wherein the first separation chamber (66) comprises a sloped bottom.

9. The apparatus according to claim 8, wherein the sloped bottom comprises at least one hole (70) arranged at a low end of the sloped bottom to allow the first fluid communication at a first flow rate of the liquid.

10. The apparatus according to claim 9, wherein the vertical low-density liquid gap (75) arranged between the first separation chamber (66) and the second separation chamber (72) allows the first fluid communication at a second flow rate of the liquid, the second flow rate being higher than the first flow rate of the liquid.

11. The apparatus according to claim 10, wherein the vertical low-density liquid gap (75) comprises a coalescent filter or removable coalescent filter (88) to increase agglomeration of droplets of the low-density liquid.

12. The apparatus according to claim 1, wherein the vessel further comprises a sloped plate (68) arranged to form a sloped bottom of the first separation chamber (66) or to form a sloped ceiling of the second separation chamber (72).

13. The apparatus according to claim 1, wherein the first separation chamber (66) further comprises a perforated plate (63) that extends across the full width of a coarse filtration chamber (62).

14. An immiscible liquids separation method comprising:
- providing a vessel comprising a first separation chamber (66) and a second separation chamber (72) being in a first fluid communication with the first separation chamber (66), the first separation chamber (66) being situated above the second separation chamber (72), a vertical low-density liquid gap (75) arranged between the first separation chamber (66) and the second separation chamber (72) to allow the first fluid communication, the vertical low-density liquid gap (75) adapted to increase agglomeration of droplets of a low-density liquid, and the second separation chamber (72) further comprising a high-density liquid release chamber (80) being in a second fluid communication with the second separation chamber (72); and a high-density liquid outlet (60) is arranged at the high-density liquid release chamber (80), wherein the high-density liquid release chamber (80) comprises a vertical release shaft (86), the vertical release shaft (86) comprises a weir plate (82) having an overflow edge (85), the overflow edge (85) being the same height as a zero waste-water flowrate level (74) in the first separation chamber (66);
- through an inlet (52) arranged at the first separation chamber (66), allowing a liquid to flow into the vessel and into the first separation chamber (66), the liquid flowing out of the first separation chamber (66) and through the vertical low-density liquid gap (75) to enter the second separation chamber (72);
- through a low-density liquid outlet (78) arranged on the second separation chamber (72), allowing a low-density liquid separated from the liquid to be removed therefrom; and
- through a high-density liquid outlet (60) arranged at the vessel, allowing as high-density liquid separated from the liquid to flow out of the vessel through the vertical release shaft (86).

15. The immiscible liquids separation method of claim 14, wherein the first separation chamber (66) further comprises a coarse filtration chamber (62) and the liquid flowing into the first separation chamber (66) flow into the coarse filtration chamber (62) before flowing into a coalescent filter or removable coalescent filter (88) in the vertical low-density liquid gap (75).

16. An immiscible liquids separation apparatus (50) comprising:
- a vessel comprising a first separation chamber (66) and a second separation chamber (72) being in a first fluid communication with the first separation chamber (66), the first separation chamber (66), the first separation chamber (66) comprises at least one open hole (70) arranged at a bottom of the first separation chamber (66) to allow the first fluid communication at a first flow rate of the liquid;

an inlet (52) arranged at the first separation chamber (66) to allow a liquid to flow into the vessel;

a low-density liquid outlet (78) arranged on the second separation chamber (72) to allow low-density liquid separated from the liquid to be removed therefrom;

a high-density liquid outlet (60) arranged at the vessel to allow high-density liquid separated from the liquid to flow out of the vessel;

a vertical low-density liquid gap (75) arranged between the first separation chamber (66) and the second separation chamber (72) to allow the first fluid communication at a second flow rate of the liquid, the second flow rate being higher than the first flow rate of the liquid, and the vertical low-density liquid gap adapted to increase agglomeration of droplets of the low-density liquid; and a high-density liquid release chamber (80) being in a second fluid communication with the second separation chamber (72), the high-density liquid outlet (60) is arranged at the high-density liquid release chamber (80), the high-density liquid release chamber (80) comprises a vertical release shaft (86) designed to allow the high-density liquid flowing out of the vessel to take fine silt comprised in the liquid out of the vessel.

17. The apparatus according to claim 16, wherein the vertical low-density liquid gap (75) comprises a coalescent filter or removable coalescent filter (88) to increase agglomeration of droplets of the low-density liquid.

\* \* \* \* \*